United States Patent [19]
Matsui

[11] Patent Number: 5,590,203
[45] Date of Patent: Dec. 31, 1996

[54] PILOT SIGNAL DETECTION CIRCUIT

[75] Inventor: Toshiya Matsui, Tokyo, Japan

[73] Assignee: Nec Corporation, Tokyo, Japan

[21] Appl. No.: 306,387

[22] Filed: Sep. 14, 1994

[30] Foreign Application Priority Data

Sep. 16, 1993 [JP] Japan .................................. 5-255163

[51] Int. Cl.$^6$ .................................................. H04H 5/00
[52] U.S. Cl. ........................................................ 381/4; 381/7
[58] Field of Search ............................ 381/4, 7; 333/20;
348/484, 486, 738; 358/198, 144

[56] References Cited

U.S. PATENT DOCUMENTS

| | | | |
|---|---|---|---|
| 4,454,607 | 6/1984 | Ogita | 381/12 |
| 4,907,082 | 3/1990 | Richards | 348/738 |

FOREIGN PATENT DOCUMENTS 2105784  4/1990  Japan .

Primary Examiner—Curtis Kuntz
Assistant Examiner—Minsun Oh

[57] ABSTRACT

A pilot signal detection circuit comprises: a PLL circuit for generating a reference signal whose frequency is same as and phase-synchronized with a carrier of a pilot signal extracted from broadcasting waves; a sync-detector for sync-detecting the carrier by using the reference signal; a frequency signal generator for generating a first pair of signals having a frequency assigned to sound multiplex broadcasting and a phase difference of 90 degrees and a second pair of signals having a frequency assigned to stereophonic broadcasting and a phase difference of 90 degrees; multiplies for multiplying the signal output from the sync detector by the output signals from the frequency signal generator; squaring circuits for squaring the output signals from the multipliers; LPFs for filtering the output signals from the squaring circuits; an adder for adding the outputs of the LPFs, and a detector for detecting the pilot signal by comparing the output of the adder with a predetermined reference level. The frequency generator generates a first and second signals from the reference signal.

10 Claims, 3 Drawing Sheets

PILOT SIGNAL DETECTION CIRCUIT

BACKGROUND OF THE INVENTION

1. Field of the Invention

The present invention relates to a pilot signal detection circuit, and more particularly to a pilot signal detection circuit for detecting a pilot signal indicating whether broadcasting is sound multiplex broadcasting or stereophonic broadcasting.

2. Related Art

A two-carrier sound multiplex system has been known as a sound multiplex system. FIG. 2 shows frequency spectrums of the two-carrier sound multiplex system. A sound signal is frequency-modulated by using two IF signals as the carrier and then transmitted. The frequency spectrums shown in FIG. 2 indicates spectrums after the IF signals are FM-detected.

As shown in FIG. 2, a first sound (voice) signal includes a (L+R) signal or a main sound signal. The second sound (voice) signal includes a (L-R) signal or a sub sound signal together with a pilot signal indicating a mode type of the transmitted signal (a stereophonic broadcasting signal or a sound multiplex broadcasting signal). A signal whose frequency is 3.5 times a horizontal sync signal (fH) of an image signal is used as the carrier. In case of the stereophonic broadcasting, the pilot signal is obtained by amplitude-modulating the carrier with a signal having a frequency of fH/133 (approx. 117.5 Hz). In case of the two-carrier sound multiplex system, the pilot signal is obtained by amplitude-modulating the carrier with a signal having a frequency of fH/57 (approx. 274.1 Hz).

A broadcasting mode is determined by detecting the frequency (fH/133 or fH/57) of the amplitude-modulating signal from the pilot signal and in accordance with the detected frequency.

A pilot signal detection circuit shown in FIG. 3 has been known. In FIG. 3, the second sound signal as shown in FIG. 2 is input to a band-pass filter (BPF) 31 which extracts the pilot signal of 3.5 fH. The extracted pilot signal is demodulated by an AM demodulator 32.

The frequency of the AM-demodulated signal is 117.5 Hz in the stereophonic broadcasting and 274.1 Hz in the two-channel sound multiplex broadcasting. Therefore, the AM-demodulated signal is supplied to a BPF 33 whose pass band having a center frequency of 117.5 Hz and a BPF 34 whose pass band having a center frequency of 274.1 Hz. The output signals from the BPFs 33 and 34 are rectified, smoothed and converted into a DC voltage by a pilot detector 35. Thereafter, the obtained DC voltage is compared with a predetermined threshold level so that the broadcasting mode corresponding to the DC voltage exceeding the threshold level is determined as the current broadcasting mode. More specifically, if the output signal from the BPF 33 is detected, the stereophonic broadcasting is determined, while if the output signal from the BPF 34 is detected, the two-channel sound multiplex broadcasting is determined.

Another conventional pilot detection circuit described in Kokai (Laid Open of Japanese Patent Application) No. 2-105784 is shown in FIG. 4.

In FIG. 4, the second sound signal is input to the BPF 41 which extracts the pilot signal of 3.5 fH and neighboring upper and lower side-band components (see FIG. 2). The output signal from the BPF 41 is input to a side-band detector 42 to detect the side bands. A pilot detector 43 detects the broadcasting mode based on the detected side bands.

A side-band detector 42 detects the side bands by using a signal of 62.5 KHz supplied from a switch 44. The switch 44 supplies one of the following signals to the side-band detector 42: (i) a signal of 62.5 KHz synchronized with fH generated by a PLL circuit comprised of a VCO 46 and a phase comparator 45, (ii) an externally supplied signal of 62.5 KHz, and (iii) a signal of 62.5 KHz obtained by 1/64 frequency-dividing a signal of 4 MHz from a 4 MHz-crystal oscillator 47 by a 1/64 frequency divider 48.

According to the circuit shown in FIG. 3, the detection accuracy of the pilot signal depends mainly on a selection characteristic of each of the BPFs 33 and 34. For this reason, the selection characteristic of the BPFs 33 and 34 must be improved in order to improve the detection accuracy of the pilot signal. More specifically, the quality factor Q of BPFs 33 and 34 must be large.

When the Q values of the BPFs 33 and 34 are set to be high, however, the variations of the center frequencies of the pass bands of the BPFs 33 and 34 must be set small. Accordingly, it is difficult to manufacture the BPFs 33 and 34. Furthermore, the BPFs 33 and 34 will be costly even if they are manufactured. Further, if the BPFs 33 and 34 are integrated into an IC, it is difficult to set the Q values of BPFs 33 and 34 high.

On the other hand, according to the conventional circuit shown in FIG. 4, three-types of reference signals (62.5 KHz signals in an example of FIG. 4) must be generated in order to detect the side bands, resulting in complicated circuit arrangement. Particularly, the arrangements of the crystal oscillator and the PLL circuit become complicated.

Further, the detection circuit shown in FIG. 4 must have the external reference signal to be supplied to the side-band detector 42. For this reason, the detection performance will be poor in weak electric field (when a received signal is weak and a level of the second input signal is low).

SUMMARY OF THE INVENTION

An object of the present invention is to provide a pilot signal detector which has a simple arrangement and can be integrated into an IC easily.

Another object of the present invention is to provide a high-sensitive pilot signal detector.

In order to achieve the above object, a pilot signal detector according to the present invention comprises: extracting means (1) for extracting a carrier of a pilot signal from a received broadcast waves; reference signal generating means (2,3,4,5) for generating a reference signal having the same frequency as and phase-synchronized with the carrier extracted by the extracting means; sync-detecting means (6) for sync-detecting the carrier extracted by the extracting means by using the reference signal; frequency signal generating means (10) for generating a pair of first signals having a frequency assigned for sound multiplex broadcasting and whose phases are different by 90 degrees each other, and a second pair of signals having a frequency assigned for stereophonic broadcasting and whose phases are different by 90 degrees each other; multiplying means (8,9) for multiplying a detection signal output from the syncdetecting means by any one of the first pair of signals and the second pair of signals; squaring means (11, 12) for squaring the output signals from the multiplying means (8,9); and detecting means (13–16) for detecting the pilot signal in accordance with a sum signal of signals output from the squaring means.

DETAILED DESCRIPTION OF THE PREFERRED EMBODIMENTS

An embodiment of the present invention will now be described with reference to the drawings.

Figure 1:
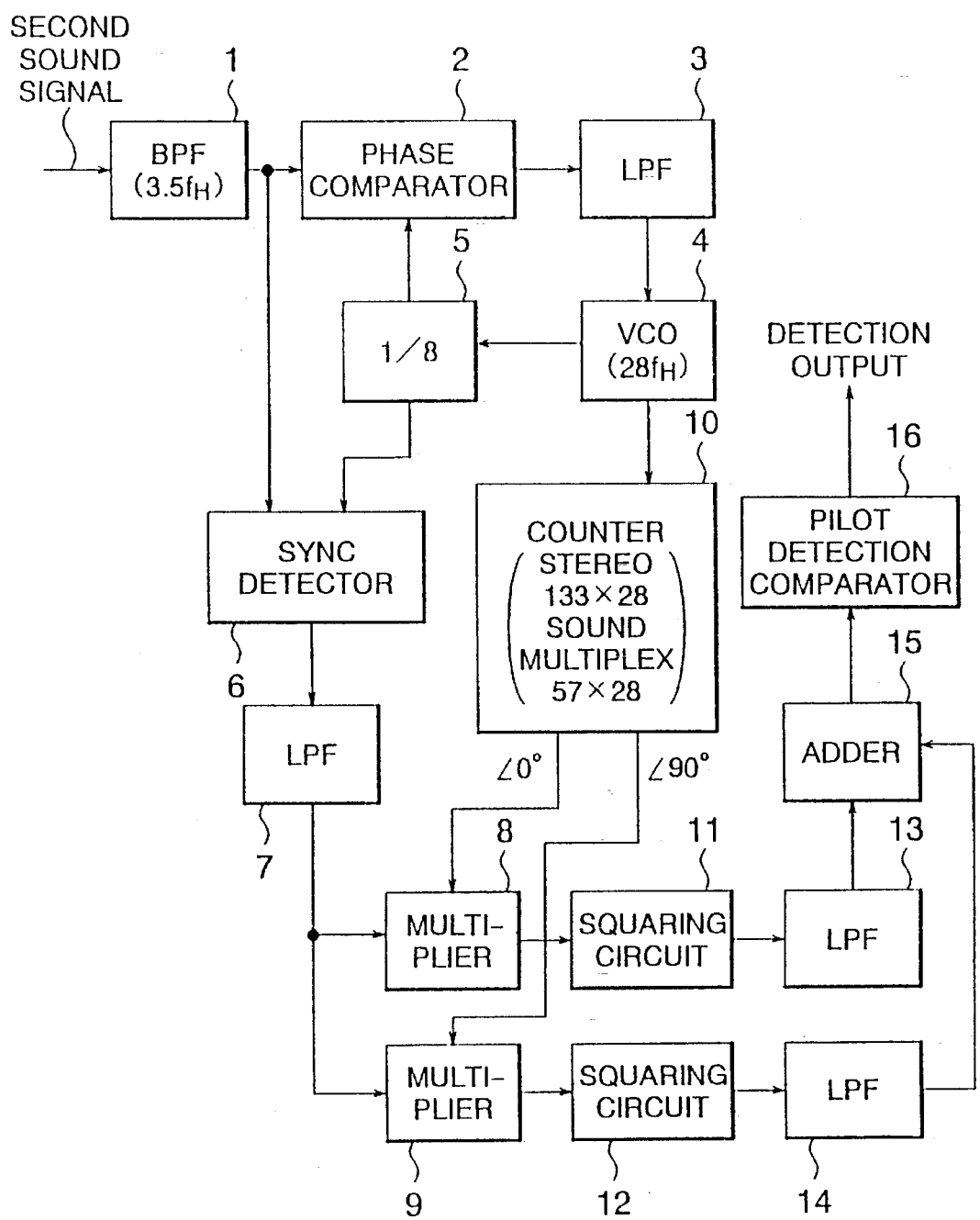
FIG. 1 is a block diagram of a pilot signal detection circuit according to an embodiment of the present invention.
Figure 2:
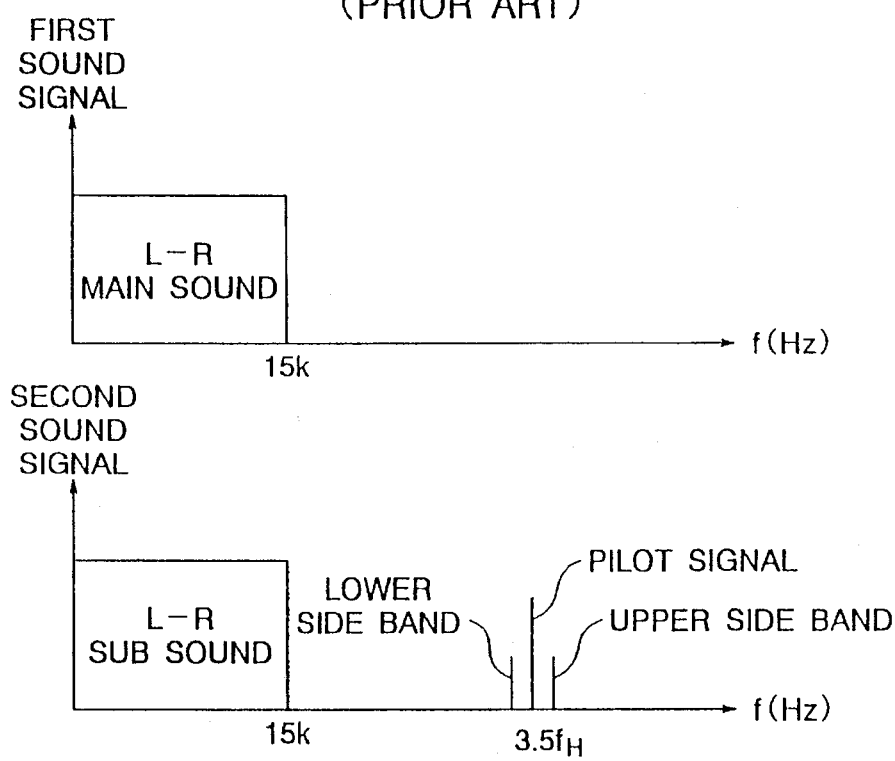
FIG. 2 is a frequency spectrum of a signal according to a two-carrier sound multiplex system.

FIG. 1 is a block diagram of a pilot signal detection circuit according to an embodiment of the present invention. In FIG. 1, the second sound signal is input to a BPF 1 whose center frequency of the pass band is 3.5 fH to thereby extract a 3.5 fH carrier signal. The extracted carrier signal is input to a sync detector 6 as well as to a phase-locked-loop (PLL) circuit.

The PLL circuit comprises a phase comparator 2 whose one input terminal receives the extracted signal output from the BPF 1, a low-pass filter (LPF) 3 which receives a signal output from the phase comparator 2, a voltage-controlled oscillator (VCO) which uses the output of the LPF 3 as a control voltage and outputs a signal having a frequency of 28 fH, and a frequency divider 5 which frequency-divides the output frequency from the VCO 4 by ⅛ and supplies the divided signal to another input terminal of the phase comparator 2.

This PLL circuit generates a reference signal having a frequency of 3.5 fH phase-synchronized with the carrier (3.5 fH) of the received pilot signal. The sync detector 6 multiplies the reference signal with the carrier of 3.5 fH which is an output of the BPF 1 to obtain an AM signal component of the received pilot signal.

The output signal from the sync detector 6 is supplied to a low-pass filter (LPF) 7. The LPF 7 extracts only the necessary AM signal component from the output signal of the sync detector 6 and supplies it to each of one input terminal of multipliers 8 and 9. To another input terminals of the multipliers 8 and 9 applied are a pair of signal supplied from a counter 10 and having phases different by 90 degrees each other.

The counter 10 is provided with a first counter circuit (133×28 counters) and a second counter circuit (57×28 counters) for counting number of waves of the signal having frequency of 28 fH (this signal is phase-synchronized with the carrier of the received pilot signal) and supplied from the VCO 4. The first counter circuit is used for detecting the stereophonic broadcasting and produces a signal wave signal whose one period is defined as a period for counting the waves 133×28 times and a sine wave signal having a phase difference of 90 degrees with respect to the former sine wave signal. These signals have a frequency indicating the stereophonic broadcasting. The second counter circuit is used for detecting the sound multiplex broadcasting and produces a sine wave signal whose one period is defined as a period for counting the waves 57×28 times and sine wave signal having a phase difference of 90 degrees with respect to the former sine wave signal. These signals have a frequency indicating sound multiplex broadcasting.

The counter 10 multiplexes the output signals of the first and second counter circuits with a predetermined period and supplies them to the multipliers 8 and 9.

The output signals of the multiplies 8 and 9 are input to squaring circuits 11 and 12, respectively. The squaring circuits 11 and 12 square the input signals and supplies them to LPFs 13 and 14. The output signals of the squaring circuits 11 and 12 mainly include two frequency components and LPFs 13 and 14 passes only low-frequency components. An adder 15 adds the output signals of the LPFs 13 and 14 each other.

A pilot-detection comparator 16 compares the output signal from the adder 15 with a threshold level and determines that (i) the current broadcasting mode is the stereophonic mode if the output from the adder exceeds the threshold level when the counter 10 outputs the signal from the first counter, and (ii) the current broadcasting mode is the sound multiplex mode if the output from the adder 15 exceeds the threshold level when the counter 10 outputs the signal from the second counter.

A signal processing in the downstream of the multipliers 8 and 9 will now be described from a view point of quantitative analysis by using equations.

Assume now that the pilot signal after the sync detection is f(t) and a pair of pilot signals input from the counter 10 are g1(t) and g2(t). Then, the following equations are satisfied.

$$f(t) = A \sin \omega p \cdot t$$

$$g1(t) = \sin \omega 0 \, t$$

$$g2(t) = \sin(\omega T o + \pi/2)$$

Then, the output signals y(t) and z(t) of multiplies 8 and 9 can be expressed as follows.

$$\begin{aligned} y(t) &= A \sin \omega p t \cdot \sin \omega 0 \, t \\ &= (A/2)\{\cos(\omega p - \omega 0)t - \cos(\omega p + \omega 0)t\} \\ z(t) &= A \sin \omega p t \cdot \sin(\omega 0 \, t + \pi/2) \\ &= (A/2)\{\sin(\omega p - \omega 0)t + \sin(\omega p + \omega 0)t\} \end{aligned}$$

The frequency components of (ωp+ω0) in y(t) and z(t) are removed by the LPFs 13 and 14, respectively, later on. However, these frequency components are, in fact, removed after squaring by squaring circuits 11 and 12. Only the difference frequency components of (ωp−ω0) need be taken into consideration. Thus, the y(t) and z(t) can be expressed as follows.

$$y(t) = (A/2) \cos(\omega p - \omega 0) \, t \quad (1)$$

$$z(t) = (A/2) \sin(\omega p - \omega 0) \, t \quad (2)$$

These signals are squared by the squaring circuits 11 and 12 in the downstream, respectively and then added by the adder 15. The sum output O(t) is expressed as the follows.

$$O(t) = (A/2)^2 \{\cos^2(\omega p - \omega 0)t + \sin^2(\omega p - \omega 0)t\}$$

After all O(t) can be expressed as $O(t) = (A/2)^2$. This reveals that only the amplitude component of the pilot signal is detected.

The pilot detection comparator 16 compares a level of the sum output O(t) with a predetermined level to detect the pilot signal.

In other words, a pair of outputs for the stereophonic broadcasting (an output with a phase of 0 degree and an output with a phase of 90 degrees and both of 117.5 Hz=fH/133) and a pair of outputs for the two-channel sound multiplex system (an output with a phase of 0 degree and an output with a phase of 90 degrees and both of 274.1 Hz=fH/57) from the counter 10 are alternatively switched with a predetermined period and applied to the multipliers 8 and 9. The pilot detection comparator 16 determines the detection output in synchronism with the switching.

Figure 3:
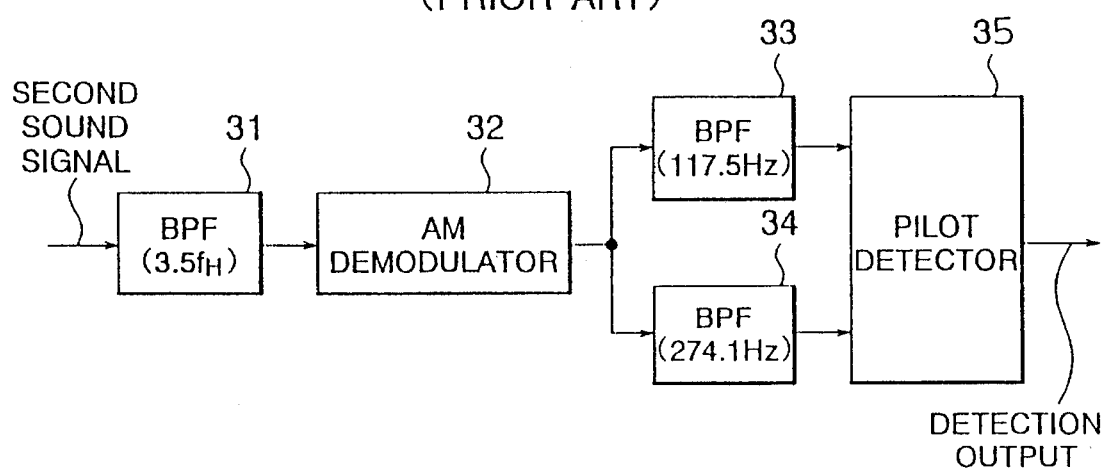
FIG. 3 is a block diagram showing an example of a conventional pilot signal detection circuit.
Figure 4:
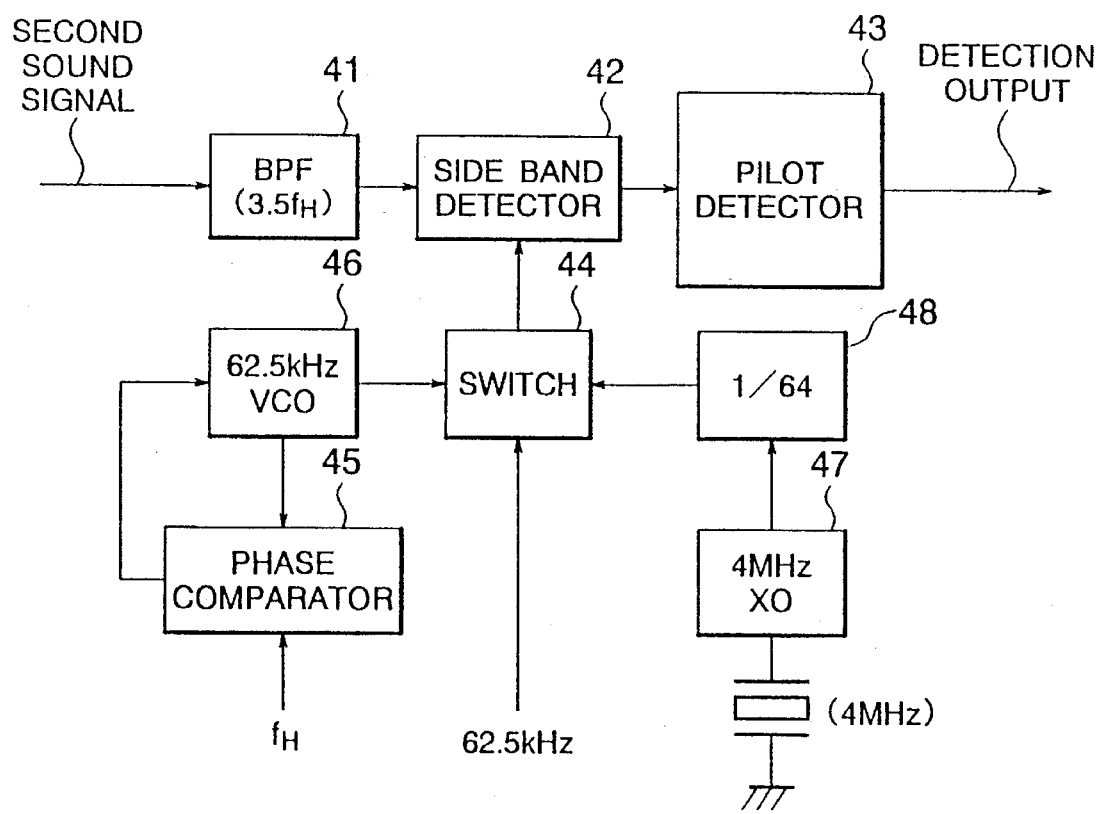
FIG. 4 is a block diagram showing another example of the conventional pilot detection circuit.

The important point in the above-described arrangement is the pass bands of the LPFs 13 and 14. By setting the pass bands narrower, the detection band of each signal of the detected y(t) and z(t) (indicated by equations (1) and (2)) is narrowed, which is equivalent to setting the Q high of the BPFs 33 and 34 in the prior art shown in FIG. 3. The Q of the LPF can be set higher than the Q of the BPF hundreds or thousands times. The Q of the LPF can be raised by lowering its cutoff frequency so that the LPF can be easily manufactured and integrated into an IC.

According to the embodiment, the pilot-detecting signals output from the counter 10 and input to the multipliers 8 and 9 are generated from the signal (an output signal from the PLL circuit) phase-synchronized with the signal of 3.5 fH included in the second sound signal. For this reason, no external reference signal is needed, and a desirable pilot signal detection characteristic can be maintained even in the weak magnetic field.

What is claimed is:

1. A pilot signal detection circuit, comprising: extracting means for extracting a carrier of a pilot signal from a received broadcast waves;

reference signal generating means for generating a reference signal having the same frequency as and phase-synchronized with the carrier extracted by the extracting means;

sync-detecting means for sync-detecting the carrier extracted by the extracting means by using the reference signal;

frequency signal generating means for generating a pair of first signals having a frequency assigned for sound multiplex broadcasting and whose phases are different by 90 degrees each other, and a second pair of signals having a frequency assigned for stereophonic broadcasting and whose phases are different by 90 degrees each other;

multiplying means for multiplying a detection signal output from the sync-detecting means by any one of the first pair of signals and the second pair of signals;

squaring means for squaring the output signals from the multiplying means; and detecting means for detecting the pilot signal in accordance with a sum signal of signals output from the squaring means.

2. The pilot signal detection circuit according to claim 1, wherein the reference signal generating means is comprised of a phase-locked-loop circuit which receives the output signal from the extracting means and outputs a signal phase-synchronized with the output signal from the extracting means.

3. The pilot signal detection circuit according to claim 1, wherein the sync detecting means includes a sync detector for multiplying the extracted carrier by the reference signal and a low-pass filter for selectively introducing a low-frequency component of the output signal from the sync detector.

4. The pilot signal detection circuit according to claim 1, wherein the frequency signal generating means alternatively outputs the first signals and the second signals with a predetermined period.

5. The pilot signal detection circuit according to claim 1, wherein the multiplying means comprises a first multiplier for multiplying the detection signal output from the sync detecting means by one of the first signals or one of the second signals, and a second multiplier for multiplying the detection signal output from the sync detecting means by the other of the first signals or the other of the second signals; and the squaring means comprises a first squaring circuit for squaring the output signal from the first multiplier and a second squaring circuit for squaring the output signal from the second multiplier.

6. The pilot signal detection circuit according to claim 1, wherein the detecting means comprises:

a first low-pass filter for passing a low-frequency component of the first output signal from the squaring means;

a second low-pass filter for passing a low-frequency component of the second output signal from the squaring means;

adding means for adding the output signals from the first and second low-pass filters; and means for comparing a signal level of the output signal from the adding means with a predetermined threshold level.

7. The pilot signal detection circuit according to claim 5, wherein the detecting means comprises:

a first low-pass filter for passing a low-frequency component of the output signal from the first squaring circuit;

a second low-pass filter for passing a low-frequency component of the output signal from the second squaring circuit;

adding means for adding the output signals from the first and second low-pass filters; and means for comparing a signal level of the output signal from the adding means with a predetermined threshold level.

8. The pilot signal detection circuit according to claim 6, wherein the detecting means determines that broadcasting is a sound multiplex broadcasting if a signal level of the output signal from the adder exceeds the predetermined threshold level when the multiplying means multiplies the first signal by the output from the sync detecting means; and determines that the broadcasting is stereophonic broadcasting if a signal level of the output signal from the adder exceeds the predetermined threshold level when the multiplying means multiplies the second signal by the output from the sync detecting means.

9. The pilot signal detection circuit according to claim 7, wherein the detecting means determines that broadcasting is a sound multiplex broadcasting if a signal level of the output signal from the adder exceeds the predetermined threshold level when the first and second multiplying circuits multiply the first signal by the output from the sync detecting means; and determines that the broadcasting is stereophonic broadcasting if a signal level of the output signal from the adder exceeds the predetermined threshold level when the first and second multiplying circuits multiply the second signal by the output from the sync detecting means.

10. A pilot signal detection circuit, comprising:

filter means for filtering a received broadcast signal to extract a carrier signal;

circuit means for generating a signal phase-synchronized with the carrier signal output from the filter means;

detecting circuit for detecting the carrier signal output from the filter means by using a signal output from the circuit means;

frequency signal generating means for generating a first signal having a frequency assigned for sound multiplex broadcasting, and a second signal having a frequency assigned for stereophonic broadcasting;

multiplying means for multiplying a signal output from the detecting means by the first signal and the second signal;

squaring means for squaring the output signals from the multiplying means; and detecting means for detecting the pilot signal in accordance with signals output from the squaring means.

* * * * *